April 14, 1964     H. A. FAERBER     3,128,800
CONFECTIONERY MOULDING MACHINE
Filed Sept. 27, 1960     9 Sheets-Sheet 1

April 14, 1964   H. A. FAERBER   3,128,800
CONFECTIONERY MOULDING MACHINE
Filed Sept. 27, 1960   9 Sheets-Sheet 2

April 14, 1964  H. A. FAERBER  3,128,800
CONFECTIONERY MOULDING MACHINE
Filed Sept. 27, 1960  9 Sheets-Sheet 3

April 14, 1964     H. A. FAERBER     3,128,800
CONFECTIONERY MOULDING MACHINE
Filed Sept. 27, 1960     9 Sheets-Sheet 5

April 14, 1964    H. A. FAERBER    3,128,800
CONFECTIONERY MOULDING MACHINE
Filed Sept. 27, 1960    9 Sheets-Sheet 6

April 14, 1964     H. A. FAERBER     3,128,800
CONFECTIONERY MOULDING MACHINE
Filed Sept. 27, 1960     9 Sheets-Sheet 7
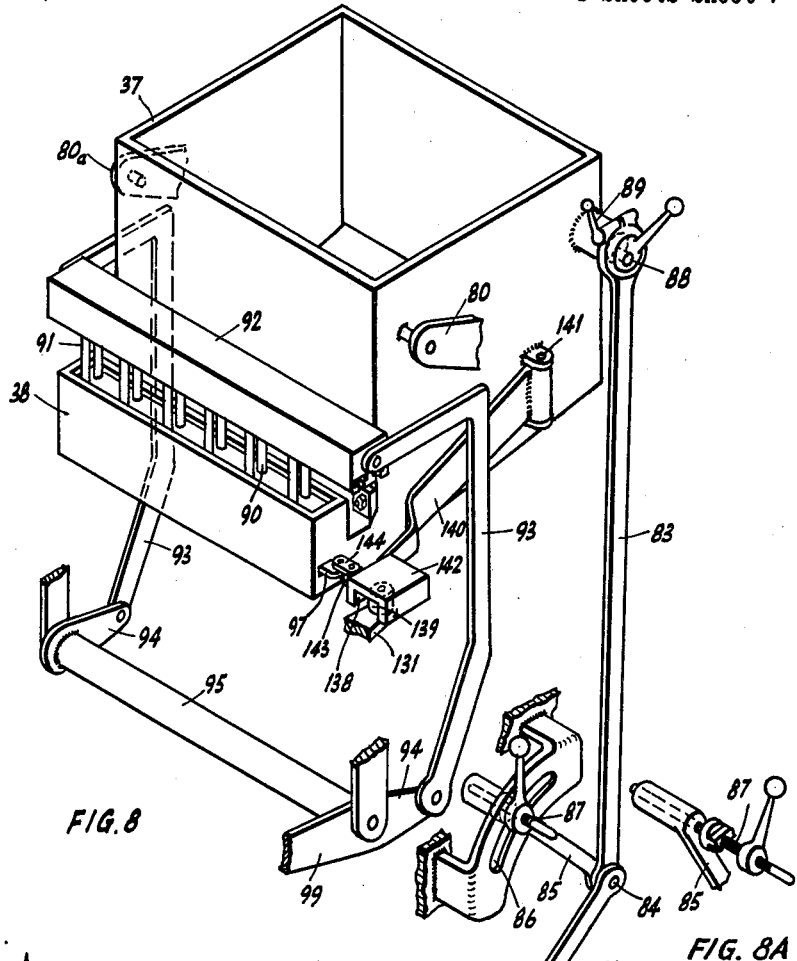
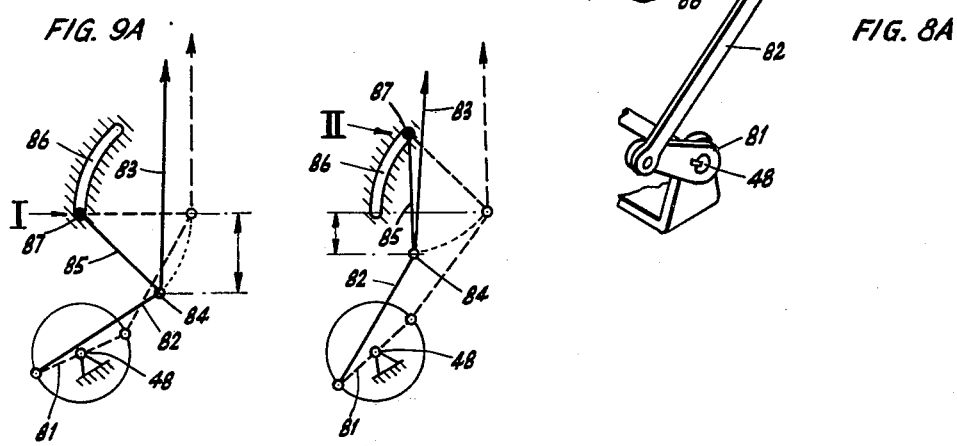
FIG. 8
FIG. 8A
FIG. 9A
FIG. 9

April 14, 1964     H. A. FAERBER     3,128,800
CONFECTIONERY MOULDING MACHINE
Filed Sept. 27, 1960     9 Sheets-Sheet 8

April 14, 1964 H. A. FAERBER 3,128,800
CONFECTIONERY MOULDING MACHINE
Filed Sept. 27, 1960 9 Sheets-Sheet 9
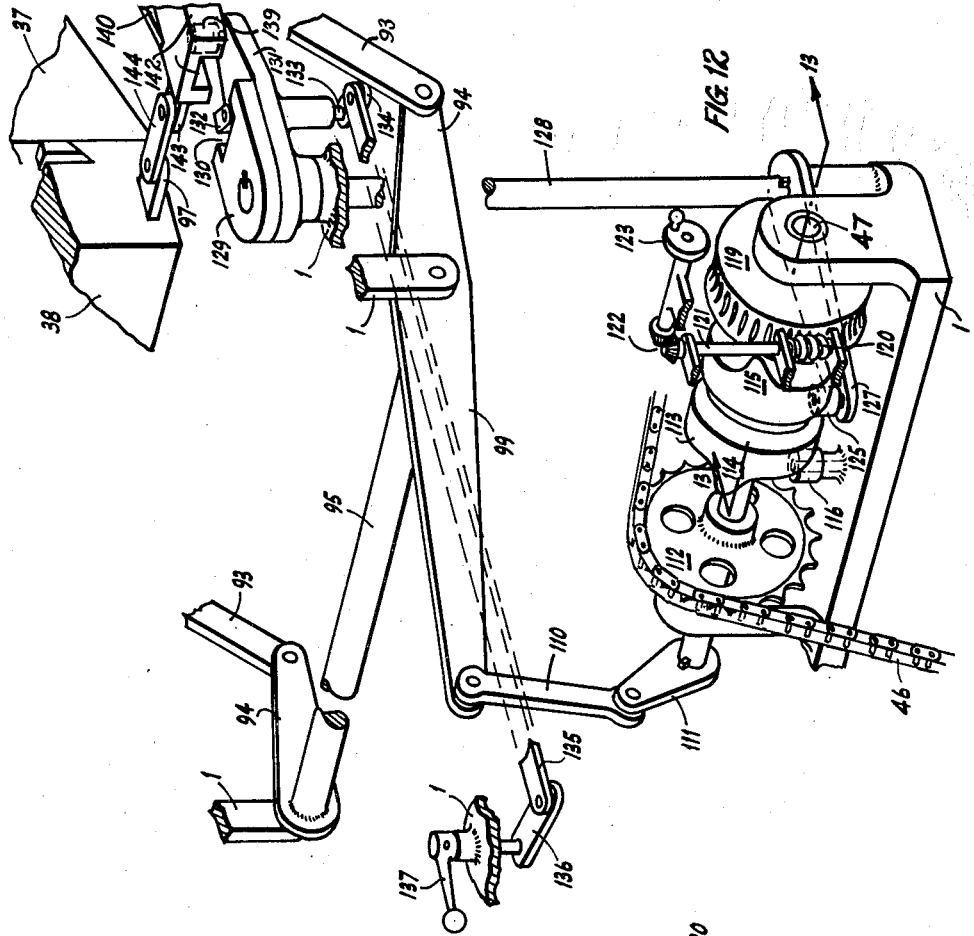
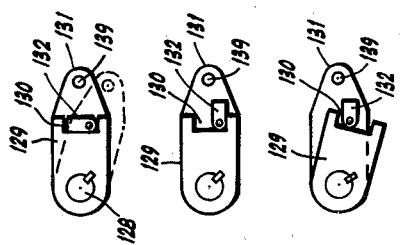
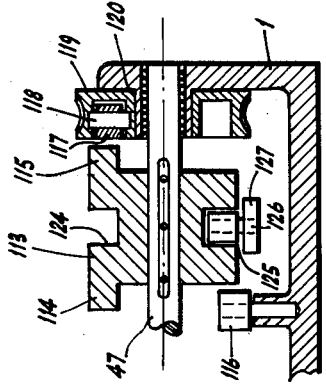

United States Patent Office 3,128,800
Patented Apr. 14, 1964

3,128,800
CONFECTIONERY MOULDING MACHINE
Hans A. Faerber, 12–16 Stokes Ave., Alexandria, near Sydney, New South Wales, Australia
Filed Sept. 27, 1960, Ser. No. 58,765
Claims priority, application Australia Aug. 19, 1957
3 Claims. (Cl. 141—137)

This invention relates to those confectionery moulding machines wherein moulds are impressed in starch-filled trays and the confectionery forming substance is deposited in the moulds. Such a machine has been disclosed in my United States patent application Serial No. 756,027 filed on August 19, 1958 for "Improved Confectionery Moulding Machine," now abandoned, of which this application is a continuation-in-part.

The confectionery moulding machine according to the invention overcomes the inaccuracies and roughness in earlier moulding machines of this type by providing means to establish a permanently fixed relationship between the various moving parts and particularly between the moving trays and the confectionery substance depositing device so that the moulds are always accurately lined up with the substance delivering nozzles, and permits changes in the operating speed without upsetting the above mentioned relationship.

In known arrangements the starch filled trays are moved by interrupted gears and ratchet mechanisms which, when they sart to wear, become inaccurate and give way to slip which will accumulate from tray to tray necessitating continuous adjustments.

As machines of this type have to be adapted for the forming of confectionery varying considerably in size the number of deposits per tray must be adjustable. While in the past these adjustments could be made only by a trial and error method, the machine according to the invention permits an accurate, simple setting of the machine to suit the particular article to be formed.

Before a detailed description of one embodiment of the invention is given, the principal operations of the machine according to the invention are described hereinafter. The filling of the trays with starch and the removal of the confectionery from the starch-filled trays is not described as these operations do not form part of this machine and can be carried out by methods already known per se.

The moulding machine consists principally of a frame having sliding rails to support the starch-filled trays and a moulding frame arranged over the rails and movable normal thereto. A traverser mechanism moves the trays along the rails. A conveyor is arranged at one end of the rails to take trays from the rails and a hopper with a metering pump device arranged over the conveyor fills the confectionery substance into female moulds impressed in the starch-filled trays by the moulding frame. A common motor including a gear box and a skip mechanism provides the drive for all the various parts of the machine to operate these parts in a predetermined time relationship.

In operating the new machine trays full of starch are placed on slide rails at the rear of the machine, from where they are moved forward one stage at a time by a reciprocating feed bar mechanism driven from suitable driving means by a linkage arranged to produce a gentle acceleration at the start and a gentle deceleration at the end of its forward stroke. Each of the feed bars is lowered at the end of its forward stroke so that it can return underneath the trays on its return stroke.

This feed bar mechanism accurately positions the trays, one at a time, under a link-driven moulding frame which carries boards at its lower side adapted for the mounting of male moulds of any desired shape. This moulding frame is lowered into the starch-filled trays while they are at rest so that female moulds of the desired shape are formed in the starch.

The moulded trays are moved forward by the feed bar mechanism on to a chain conveyor carrying lugs which are at a pitch slightly longer than the length of the trays.

The chains and feed bar mechanism are synchronized by their arrangement and construction so that, as the trays are brought by the feed bars on to the moving chain conveyor, the trays almost touch the leading lugs of the chains.

As the conveyor progresses, the following lugs of the chains come up over the drive sprocket of the conveyor into a position directly behind the next tray.

These chains move the tray at a steady speed under the confectionery depositing device. Furthermore the chain conveyor driving mechanism is so arranged that when a tray reaches the depositing device the conveyor is slowed down and when the end of the tray passes the depositing device is speeded up momentarily to avoid material being deposited in the gap between the trays or on the edges of the trays.

The depositing device which forms part of the hopper containing the confectionery substance, consists of a metering pump including a shuttle valve operated automatically by the machine. This valve has two operating positions. In one position the cylinders or barrels of the pump are connected hydraulically to depositing nozzles on the underside of the head which are arranged so that they correspond to the impressions formed transversely in the trays by the moulding frame. In the other position, the barrels are connected to the supply hopper and the nozzles are cut off.

The hopper with the nozzles is arranged in such a way that it swings forward to follow a row of impressions in the moving trays while material is being deposited, and swings back again to register with the following row of impressions while the pump barrels are being replenished with the confectionery substance.

The plungers in the barrels of the depositing device are operated upwards and downwards with a constant stroke in synchronism with the backward and forward movement respectively of the hopper and depositing device.

The mechanism provided for the operation of the shuttle valve moves the shuttle valve over to the position where the barrels communicate with the supply hopper when the plungers reach the bottom of their stroke. In this way the barrels are replenished from the hopper while the plungers move upwards. To control the volume of confectionery substances deposited into the trays the time at which the shuttle valve connects the barrels with the depositing outlets during the downstroke of the plungers is made adjustable. The later the valve connects the barrels with the outlets during the downstroke of the plungers, the smaller is the amount of substance deposited in each mould of the tray.

The mechanisms operating the depositing device's plungers, the hopper and the shuttle valve are locked in synchronism as are the feed bar mechanism, the moulding frame and the chain-conveyor.

These latter mechanisms are connected with the common drive through a gear box which determines the number of cycles which the depositing mechanism has to perform as each tray passes under it.

This gear box is of the constant mesh type, so that when different ratios are selected to determine the number of depositing cycles the synchronism between the various parts of the machine is maintained. The gear box includes also a skip mechanism adapted to give the chain conveyor a retarding and accelerating movement as mentioned above.

One embodiment of the invention will now be described in detail in connection with the drawings in which:

FIG. 8 is a perspective view of the hopper and pump mechanism;

FIG. 8A is an enlarged fragmentary detail view of the means for adjusting the hopper setting;

FIGS. 9 and 9A show two diagrams explaining the setting of the hopper movement;

FIG. 12 shows a perspective view of the operating mechanism for the pump shown in FIG. 8; and FIG. 13 is a cross section along the lines 13—13 of FIG. 12; and FIG. 14 shows the setting of the clutch mechanism shown in FIG. 12.

Figure 1A:
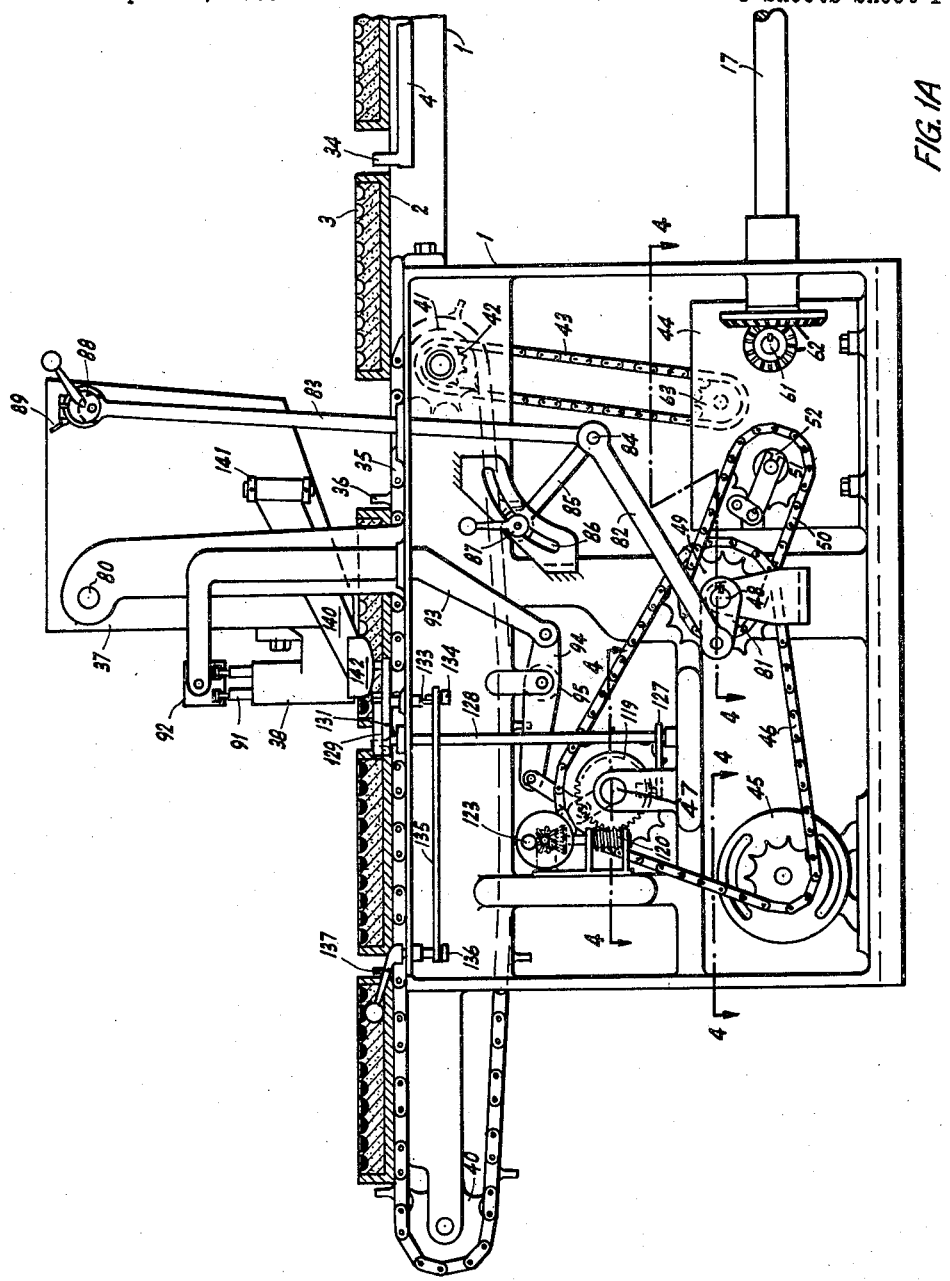
FIGS. 1A and 1B are a side elevation of the confectionery moulding machine showing the individual trays in longitudinal section.
Figure 1B:
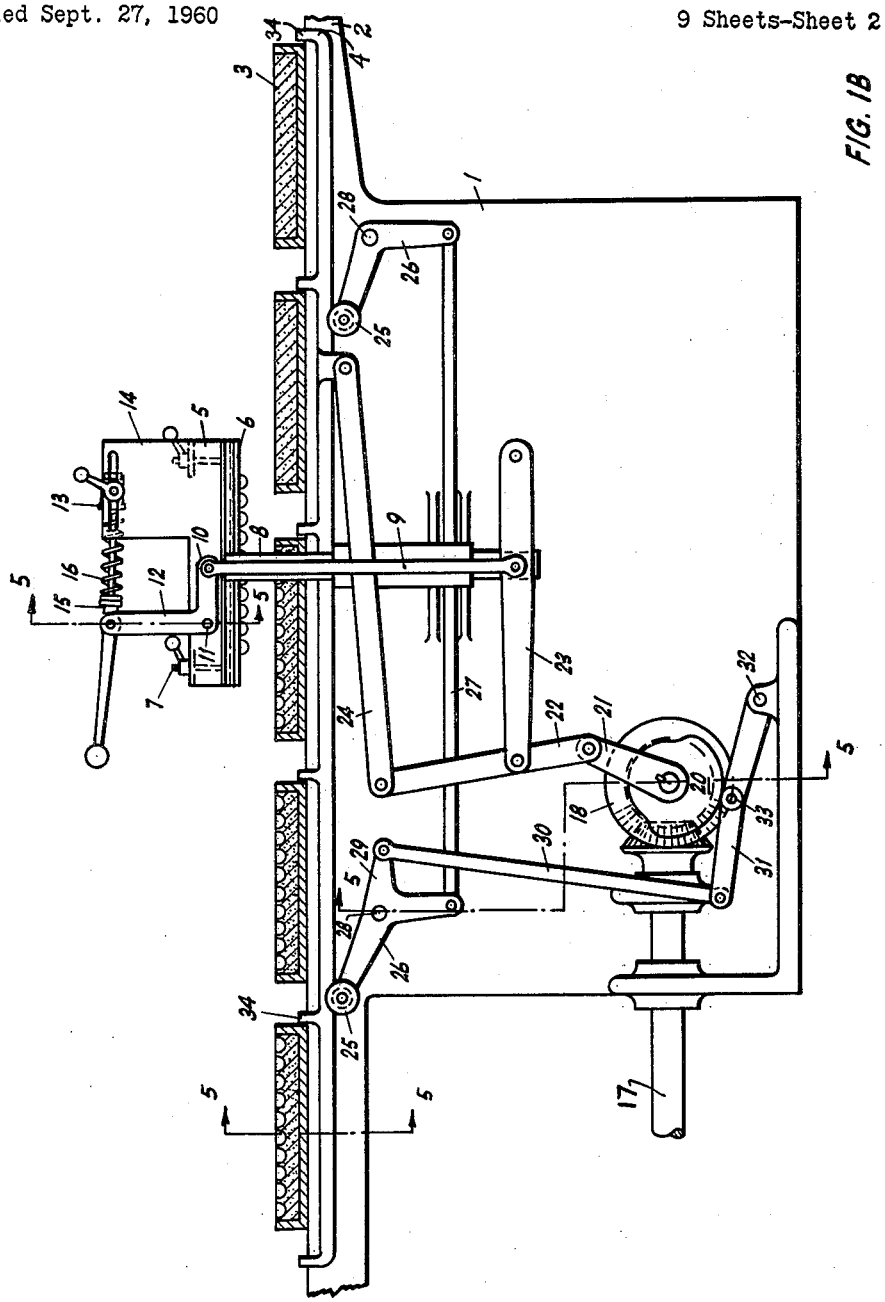
Figure 5:
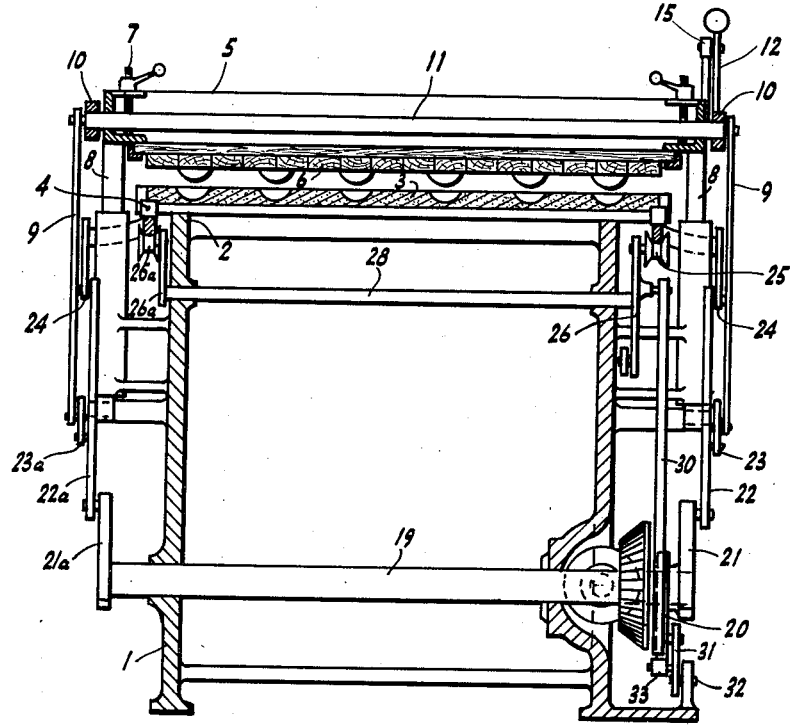
FIG. 5 is a sectional view along the lines 5—5 of the moulding part as shown in FIG. 1B.

In FIG. 1B and FIG. 5 a frame work 1 has upper edges or slide rails 2 which carry the starch-filled trays 3 into which the confectionery is to be moulded. The trays 3 are moved lengthwise along the rails 2 by a traverser mechanism having feed bars 4 which impart an intermittent movement on the trays to pass them one after the other underneath the moulding frame 5, which at its lower edge carries the mould board 6 with the individual male moulds fixed thereto. The movement of the moulding frame 5 and the trays 3 is so co-ordinated that the trays are stopped underneath the moulding frame when this latter frame is lowered to press the mould board into the starch.

Figure 6:
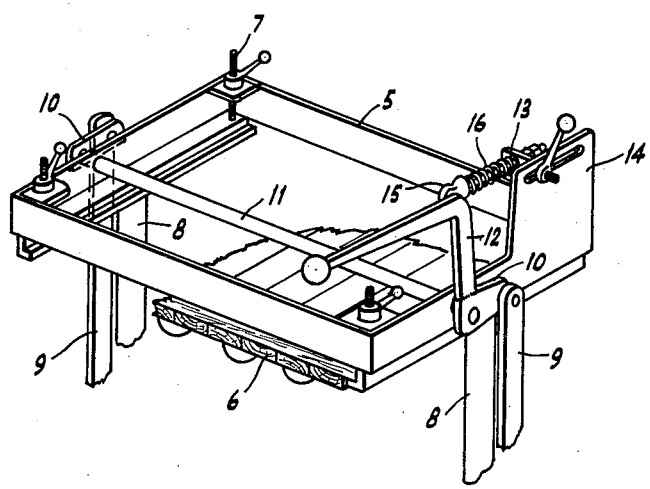
FIG. 6 is a perspective view of the moulding frame.

Details of the moulding frame are shown in FIG. 6. The frame 5 carries at its lower edge the moulding board 6 fixed thereto by clamp screws 7. The frame 5 is guided in its vertical movement by the posts 8 and is moved vertically by means of levers 9 on each side thereof which are connected by cranks 10 with a shaft 11 pivoted within the frame 5. To adjust the lowest position of the frame 5 in relation to the trays 3 a crank lever 12 is connected with the crank 10 on one side of the frame. A pitman 15 is pivotally fixed to the crank lever 12 and is slidably mounted in a bracket 13 which is adjustably mounted on an extension 14 of frame 5.

A spring 16 on the pitman 15 is compressed against the bracket 13, and its tension can be varied by adjustment of the bracket in the extension 14. In the event that the frame 5 strikes an obstruction before or during a mould impressing operation the spring permits a relative movement between crank lever 12 and frame 5 thus allowing the reciprocating mechanism to continue its cycle. With only one spring 16 acting through the transverse shaft 11 on the other side of frame 5 a parallel motion of the frame is ensured.

The feed bars 4 (FIG. 1B) are driven through a linkage as will be described hereinafter from a common shaft 17 which in turn is driven through a gear box from a common electro-motor as will be shown later on.

The shaft 17 drives through a bevel gear 18 the transverse shaft 19 which carries a cam 20 and two cranks 21 and 21a (FIG. 5). Crank levers 21 and 21a are connected with floating levers 22 and 22a on both sides of the machine. These levers impart a vertical movement to the moulding frame 5 as well as a horizontal movement to the transverse feed bars 4. Lever 22 is connected via the lever 23 with the vertical level 9 which moves the moulding frame 5. Lever 23 is pivoted at one end at the machine frame so that on movement of the crank 21 this lever moves in a vertical plane around its pivot.

The upper end of lever 22 is connected by a bar 24 to the feed bar 4 to move this feed bar in a horizontal plane. The feed bar 4 is supported by two rollers 25 fixed to bell crank levers 26 which are connected by a bar 27 so that they move on their pivots 28 in the same direction.

One of the bell crank levers 26 has an extension 29 which is connected via lever 30 with a lever 31 pivoted at pivot 32 at the frame 1. The lever 31 carries a small roller 33 which contacts the cam 20 and moves the lever 31 in accordance with the shape of the cam 20.

The operation of cam 20 thus moves the lever 30 upwards and downwards and this in turn lifts the rollers 25 and lowers them so that the feed bars 4 are pushed up and lowered in accordance with the movement of cam 20. Each feed bar 4 has a number of extensions 34 which are spaced in accordance with the spacing between the various trays 3 moving along the rails 2.

In the raised position of the feed bars 4 the extensions 34 can come into contact with the corresponding trays 3 so that on horizontal movement of the feed bars via the lever 24 the trays are moved forward along the rails. In the lowered position of the feed bars the extensions 34 can move freely underneath the trays so that on reverse movement of the feed bars by lever 24 these feed bars can move back to engage the next set of trays.

The movement of the feed bars 4 in the longitudinal as well as in the vertical direction is synchronized by the arrangement of the cam 20 in relation to the crank lever 21. At the same time the movement of the moulding frame 5 through the linkage of lever 21, 23 and 22 is also synchronized with the movements of the feed bars 4 so that each time the moulding frame 5 reaches its lowest position one of the trays 3 is directly underneath the frame in a stationary condition. In FIG. 5 corresponding levers on the other side of the frame are marked with the same reference numerals and the suffix *a*.

Figure 2:
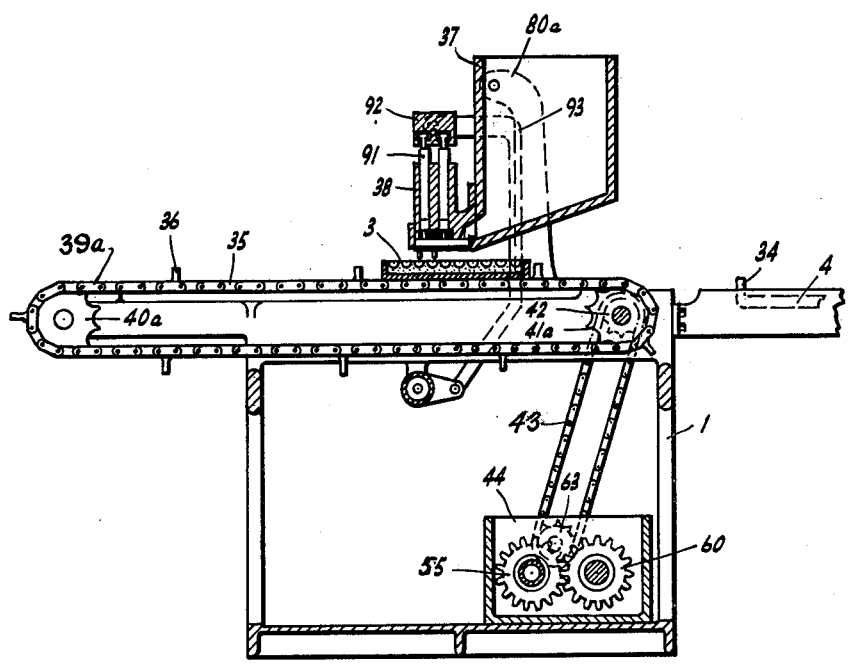
FIG. 2 is a longitudinal section through the filling mechanism as shown in FIG. 1A.
Figure 3:
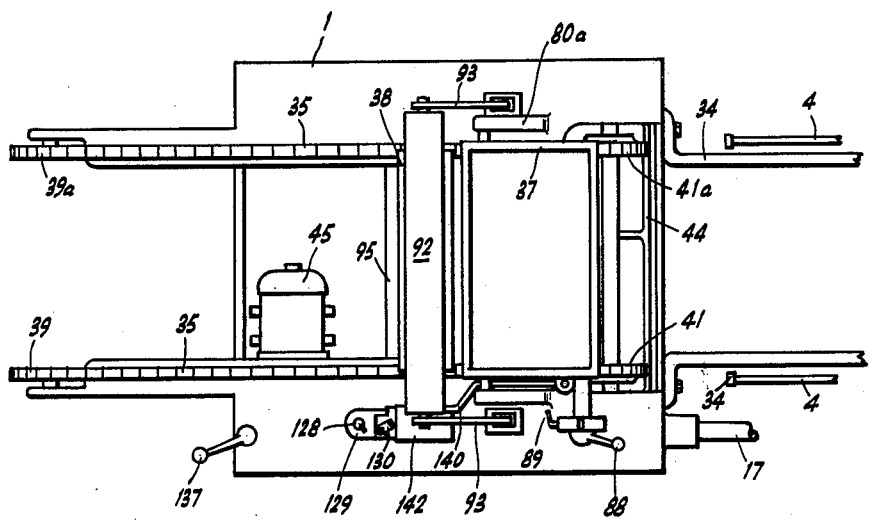
FIG. 3 is a plan of the mechanism as shown in FIG. 2.
Figure 4:
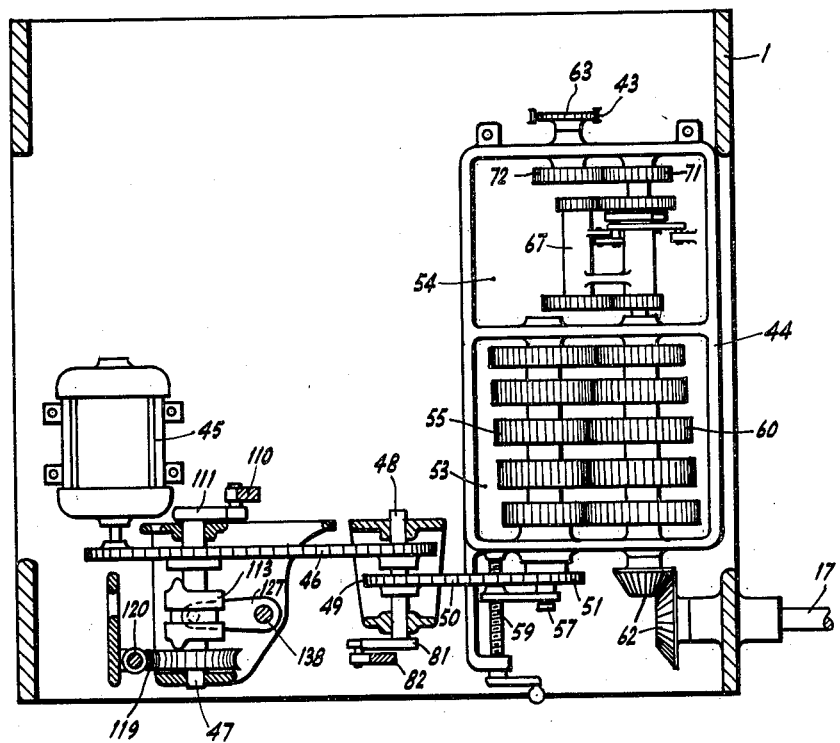
FIG. 4 is a sectional view of the machine along the lines 4—4 in FIG. 1A.

FIG. 1A shows the filling mechanism and the common drive for the machine. The trays 3 are pushed along the rails 2 of frame 1 by extensions 34 of feed bars 4 as described before in connection with FIG. 1B until they reach the chain conveyor 35. The conveyor 35 has lugs 36 which move the trays one after the other to the filling position underneath the filling hopper 37 with its metering pump mechanism 38. The conveyor 35 consists of chains 39 and 39a (FIGS. 2 and 3) which run over sprocket wheels 40 (not shown), 40a, 41 and 41a respectively. The sprocket wheel 41a carries a sprocket wheel 42 which is driven by a chain 43 from gear box 44 as will be described in detail later on.

The gear box is so arranged that the drive via the chain 43 is synchronized with the drive of the feed bars 4 via shaft 17 so that each lug 36 of the conveyor 35 engages the rear of a tray 3 each time a tray is pushed forward by the extensions 34 of the feed bars 4.

Figure 7A:
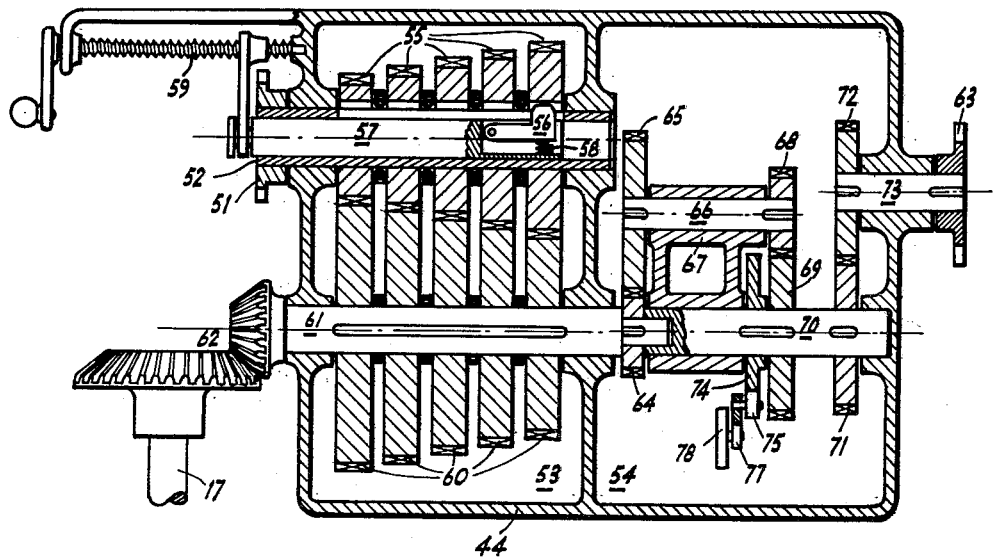
FIG. 7A is a plan section of the gear box including the skip mechanism.
Figure 7B:
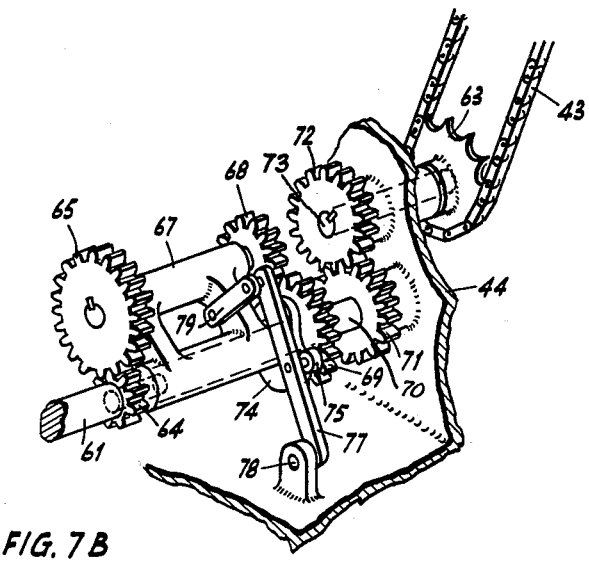
FIG. 7B shows a perspective view of the skip mechanism as shown in FIG. 6.

The common drive for the whole machine is provided by an electric motor 45 which drives via a chain 46 the shafts 47 and 48. The functions of these shafts will be described later. The shaft 48 carries a sprocket wheel 49 which, by means of the drive chain 50, drives the sprocket wheel 51 fixed to the shaft 52 leading into the gear box 44. The arrangement of the gear box 44 is more clearly shown in FIG. 7A. The gear box 44 is subdivided into two compartments 53 and 54 the compartment 53 containing a constant mesh gear and compartment 54 containing the skip mechanism for retarding and acceleration of the conveyor 35 as described hereafter in connection with FIG. 7B. The drive shaft 52 is a hollow shaft and carries freely rotating thereon a group of gear wheels 55. The gear wheels 55 can individually be coupled to the shaft by a key 56 which is fixed to the rod 57 and is pressed into a corresponding groove in the selected gear wheel by a spring 58. The push rod 57 extends to the outside of the gear box and can be moved longitudinally within the hollow shaft 52 by means of hand-operated screw arrangement 59. Thus it is possible to selectively couple any of the wheels 55 at will with the drive shaft 52.

The gear wheels 55 mesh with corresponding gear wheels 60 fixed on an intermediate shaft 61 thus driving via the bevel gears 62 the shaft 17 which, in turn, drives the feed bars and the moulding frame (FIG. 1B). The intermediate shaft 61 is further connected with the skip mechanism in compartment 54 designed to drive the sprocket wheel 63 which engages the chain 43. The skip mechanism converts the constant speed of the drive shaft 61 into a varied speed so that the conveyor 35 is driven with variable speed at certain times to provide retardation or acceleration of the trays 3 on the conveyor 35.

The shaft 61 drives the tooth wheel 64 which is in mesh with a corresponding wheel 65. The latter is fixed to an intermediate shaft 66 held by a swinging shackle 67 and rotatable therein. On the other end shaft 66 carries a tooth wheel 68 which meshes with a corresponding wheel 69 fixed to an axle 70. The axle 70 carries a further tooth wheel 71 in mesh with tooth wheel 72 which is fixed to the shaft 73 carrying at the other end the sprocket wheel 63.

The axle 70 is connected with shaft 61 by a spigot-type joint and is supported on the other end in a bearing in the wall of the gear box. Furthermore axle 70 acts also as a bearing for the shackle 67 which can freely swing around axle 70.

The swinging movement of the shackle 67 is controlled by a cam 74 fixed to axle 70 and co-operating with a roller 75 fixed to a lever 77 pivoted by pivot 78 to the gear box. The free end of the lever 77 is linked by a link 79 to the shackle 67, and thus the shackle 67 swings around the axle 70 maintaining the engagement between its wheel 65 and 68 and the corresponding wheels 64 and 69. The relative movement of shackle 67 with its wheels 65 and 68 to the axle 70 with its wheels 64 and 69 determines the speed with which the gear wheels 71 and 72 and the outside sprocket wheel 63 rotate. Thus the speed of chain 43 and the speed of the conveyor 35 are changed accordingly. The cam 74 is so designed that when a tray 3 reaches the pump 38 to be filled with confectionery the tray is slowed down in its movement to pass rather slowly underneath the pump nozzles. When the tray has passed the pump 38 this lost motion is picked up as the gear box speeds up conveyor 35, so that no substance will be squirted by the pump into the space between two trays.

The hopper 37 holding the confectionery substance is located above the conveyor 35 and pivoted on trunnions 80 and 80a fixed to the machine frame 1, so that the hopper 37 can swing forward in conformity with the movement of the trays on the conveyor 35 during the depositing operation, and can then return to the next row of impressions to be filled. The metering pump 38 is incorporated to deliver from the hopper a predetermined charge of the confectionery substance. The swinging movement of the hopper 37 is effected by a drive from shaft 48 over a crank lever 81, lever 82 and lever 83 (FIG. 8). The linkage point 84 between levers 82 and 83 is connected to the frame work by the link 85 adjustable in an arc shaped slot 86 and clampable thereto by clamp screw 87. This adjustment permits a change in the length of stroke of lever 83 as explained below in connection with FIGS. 9 and 9A. FIGS. 9 and 9A show the two end positions of the adjustment of lever 85. Position I in FIG. 9A gives maximum stroke of lever 83 when shaft 48 rotates the crank lever 81. In position II shown in FIG. 9 the stroke of lever 83 is considerably reduced as the movement of the linkage point 84 is changed from a substantially vertical to a substantially horizontal movement. A further adjustment of the hopper 33 in a horizontal plane for lining up the hopper with the impressions in the tray is provided by an adjustable eccentric pivot connection 88 linking lever 83 and a top corner of the hopper 37 having a clamp screw 89 to fix the position after proper adjustment has been made.

Connected with the hopper 37 is the metering pump 38 designed to release a certain amount of confectionery substance into the moulds. The pump 38 consists of a bank of barrels 90 which in the embodiment shown are arranged in two rows. Any other number of rows may be incorporated when required. The plungers 91 (FIG. 10) are connected to a cross head 92 which is connected by rods 93 (FIG. 8) to cranks 94 fixed to the shaft 95.

Figure 10:
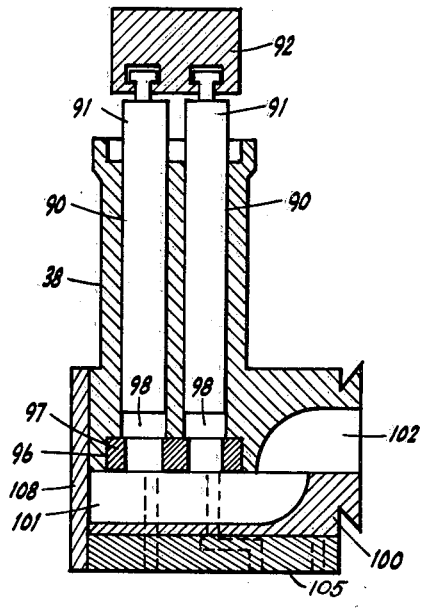
FIG. 10 shows a cross section through the metering pump.
Figure 11:
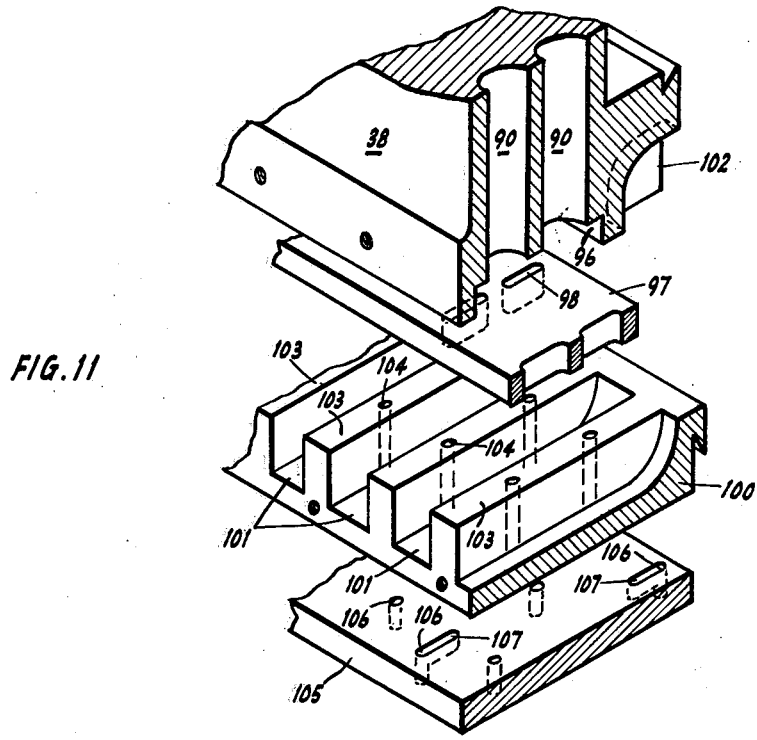
FIG. 11 is a perspective exploded view through the same pump.

It can be seen in FIGS. 10 and 11 the pump body 38 has a transverse recess 96 and a shuttle valve 97 slidable therein. This shuttle valve 97 consists of a plane rectangular block which has substantially rectangular through-ports 98 therein, one for each barrel, located transversely to the line of movement of the shuttle valve.

A valve chamber 100 is fixed to the bottom of the barrel block of pump 38. This chamber is of substantially rectangular shape having a number of transverse inlet ports 101 therein, one for each pair of barrels 90. These inlet ports 101 are open to the lower ends of the barrels 90 and register with the common feed port header 102 in the base of the pump barrel block. This feed port is in communication with the hopper 37. Division walls 103 separating the inlet ports constitute a slide base for the shuttle valve 97, and each division wall has an outlet 104 which passes through the valve chamber. The reciprocating movement of the shuttle valve 97 is such that the ports 98 therein can register either with the valve chamber inlet ports 101 and the barrels 90 or with the barrels 90 and the outlet ports 104.

The inlet ports 101 of the pump are opened during the suction stroke and for metering purposes they may be caused to remain open for part of the return stroke, thus forcing part of the contents of each barrel back into the hopper 37. When the shuttle valve 97 is moved to the delivery position the remaining contents of each barrel are discharged through the outlet ports 104.

A distribution and nozzle plate 105 is attached to the bottom of the valve chamber 100. This plate is provided with through ports 106 which for row delivery are in alignment and register with the outlet ports 104 in the valve chamber 100. When other lines of delivery are required an alternative distribution nozzle plate can be fitted with through ports 106 located in the desired arrangement. Slots 107 are formed in the upper face of the plate 105 which register with the through ports 106 and with the outlet ports 104 in the valve chamber 100.

In the example shown, two rows of barrels 90 are formed in one barrel block and each inlet port 101 in the valve chamber 100 leads to two barrels. At the back of the valve chamber the inlet ports are closed by the removable plate 108 which can be removed to permit additional barrel blocks to be added to the unit. The plate 108 can also be removed to facilitate cleaning of the pumping mechanism.

One advantage of the above arrangement is that the ports in the valve chamber are comparatively large and accommodate a substantial volume of the confectionery substance which can be drawn into the barrels without cavitation.

As mentioned before the cross head 92 is moved upwards and downwards by rods 93 connected to the cranks 94 and the cross shaft 95. One of the links 94 has integral therewith an extension 99 (FIG. 12) which is connected via a link 110 and a crank 111 with a shaft 47 driven by the chain 46 and the sprocket wheel 112. The same shaft 47 provides also the movement for the shuttle valve 97.

On shaft 47 is also mounted a cam 113 which is rotated by shaft 47 but is free to slide axially thereon. This cam has lobes 114 and 115 which move it along shaft 47 when the lobes strike rollers 116 and 117 respectively. As can be seen from FIG. 13 the roller 116 is mounted on the frame while the roller 117 is supported by pin 118 in the volume adjusting wheel 119 which in turn is mounted freely rotatable on sleeve 120 co-axially with shaft 47. On the periphery of wheel 119 a worm is formed which meshes with worm wheel 120, and this latter is connected by shaft 121 and bevel gears 122 to a manual control 123.

Cam 113 has a circumferential groove 124 in which a roller 125 engages to transmit axial movement of cam 113 through pivot 126 to a link 127 which is attached rigidly to shaft 128 (FIG. 12) pivotally mounted in the frame. Shaft 128 carries at its upper end an arm 129 which has a slot 130 formed therein. A further arm 131 is arranged underneath arm 129, but is freely rotatable on shaft 128. This arm 131 can be coupled to the arm 129 by means of a clutch block 132 operably connected to the upper end of a rod 133. The lower end of rod 133 carries a link 134 which is connected to a bar 135 and a further link 136 with an operating handle 137. Movement of this handle 137 moves the clutch block 132 from one extreme position to the other as explained hereinafter in connection with FIG. 14.

As shown in the top position of FIG. 14 the clutch block 132 is in its fully engaged position and thus arms 129 and 131 are completely locked together so that on movement of shaft 128 the arm 131 moves together with the arm 129 in both directions.

In the second and third position shown, the clutch is disengaged. When arm 129 moves upwards it takes arm 131 with it, but the arm 131 remains in the upward position while arm 129 moves back again as shown.

The arm 131 carries at its free end a roller 139 (FIG. 12) engaging a slot 138 in a guide block 142. This guide block is fixed to the lever 140, which is hinged to one side of the hopper 37 as shown by the hinge 141 (FIG. 8).

On one side the block 142 has a lug 143 formed thereon which is connected by a link 144 with the slide valve 97 of the pump arrangement. When the clutch is engaged the shuttle valve 97 will, therefore, move backwards and forwards in conformity with the movements of the cam 113. The clutch arrangement makes it possible to cut off any delivery of confectionery substance from the pump metering arrangement when no trays are underneath the hopper. When the clutch is disengaged the outlet ports will be automatically closed and remain closed while the arm 129 is moved backwards and forwards by cam 113.

The timing of the operation of the shuttle valve 97 in relation to the movement of the cross head 92 can be adjusted by the worm 119. Adjustment of the worm 119 by the handle 123 changes the relative position of the roller 117 with regard to the crank 111 and thus also with regard to the downstroke of the cross head 92.

The roller 116 operating together with the cam 113 closes the valve 97 at each end of the down stroke with the plungers in their lowest position.

As can be seen from FIG. 1A and described earlier the shaft 47 operating the pump mechanism and the shaft 48 operating the hopper mechanism are linked together by the chain 46 and therefore, move at all times in fixed relation to each other. In addition the chain 50 driven from shaft 48 by sprocket wheel 49 operates the gear box 44 and thus imparts a similar strictly related movement to the chain 43 driving the conveyor 35 and the shaft 17 driving the feed bars 4 and the moulding frame 5.

To adapt the machine for trays having a different number of rows of moulds for depositing confectionery substance the gear box 44 can be adjusted to change the relationship between the speed of the conveyor 35 and the operation of the hopper 37. As mentioned before this gear box has a constant mesh gear so that by changing from one ratio to the other the mechanism can never fall out of step and a perfect synchronism between the various moving parts is maintained.

As only gear wheels and chain drives are employed there is no possibility for a slip in any of these drives so that even on continuous operation the perfect relationship between the movement of the trays, the movement of the hopper and the operation of the pump mechanism is safe guarded.

I claim:

1. In a confectionery moulding machine having slide rails to support a plurality of trays, a conveyor adjacent one end of said slide rails adapted to move said trays from said slide rails on to said conveyor, conveyor driving means arranged to impart a continuous periodically varying speed on said conveyor, a confectionery substance hopper arranged above said conveyor, trunnions fixed to said frame pivotally supporting said hopper a continuously rotating shaft and a crank fixed thereto, a link connecting said crank with a floating pivot and a further link connecting said floating pivot with said hopper, eccentric means at said hopper to adjust the connection between said further link and said hopper, a third link having one end thereof connected to said floating pivot, and adjusting means connected to said third link and adjustably mounted on said frame to alter the position of said floating pivot and thus the stroke of said further lever, a pumping and metering device connected with said hopper and consisting of two banks of barrels, plungers in said barrels connected to a crosshead, a rocking shaft having cranks thereon and connection levers linking said cranks with said crosshead to impart a reciprocating movement on said plungers, a continuously rotating axle and a bracket supporting said axle and mounted on said frame, a crank fixed to said axle, a link connecting said crank with said rocking shaft for the movement thereof, a transverse valve chamber arranged underneath said barrels, a shuttle valve in said valve chamber having a through port therein for each barrel, a delivery nozzle plate with ports therein mounted underneath said valve chamber, means to reciprocate said shuttle valve and to control the movement thereof, and common driving means connected to drive said conveyor driving means, said rotating shaft, said rotating axle and said shuttle valve operating means in predetermined time relationship.

2. A confectionery moulding machine having a pumping and metering device as claimed in claim 1 wherein the shuttle valve operating means consist of a cam slidably mounted on said rotating axle and rotatable therewith, a circumferential groove in said cam and lobes on opposite sides of said cam, a shaft having an arm with a roller therein in engagement with the groove in said cam, a driving arm fixed on said shaft and a driven arm rotatable thereon, a clutch mechanism to engage and disengage said arms, manually operable lever means connected with said clutch mechanism for the operation thereof, a guide block having an arm pivotally connected to said hopper, a swivel coupling connecting said guide block and said driven arm and a link connecting said guide block with said shuttle valve, a roller mounted on said axle bracket and located in the track of one lobe of said cam, a worm wheel rotatably mounted on said axle, a roller mounted in the inner face of said worm wheel and located in the track of the other lobe of said cam, a worm in engagement with said worm wheel and a manual control for said worm to adjust the time relation between the movements of said cam on said axle produced by the impact of said lobes with the corresponding rollers.

3. In a confectionery moulding machine having slide rails to support a plurality of trays, and a tray moving mechanism, a conveyor adjacent one end of said slide rails adapted to move said trays from said slide rails on to said conveyor, conveyor driving means arranged to impart a continuous periodically varying speed on said conveyor, a confectionery substance hopper incorporating a metering pump device arranged above said conveyor, means to reciprocate the lower end of said hopper in a substantially horizontal plane and further means to operate said metering pump device, a motor fixed within said frame, a chain drive from said motor to said hopper reciprocating means and said metering pump operating means, a gear box and a chain drive from said hopper reciprocating means to said gear box, said gear box including a housing, a hollow shaft mounted therein, a first set of gear wheels rotatably mounted on said shaft, a slot in said shaft and a key slidable therein, means to shift said key longitudinal for coupling said shaft with a selected wheel of said set, and a further shaft supported in said housing, a further set of gear wheels fixed to said shaft and arranged in constant mesh with said first set of gear wheels, a first bevel gear wheel attached to said further shaft, a driving shaft with a second bevel gear wheel on one end thereof in mesh with said first bevel gear wheel, means connecting the other end of said driving shaft with said tray moving mechanism, a skip mechanism included in the gear box housing and driven by said gear wheels, a sprocket wheel connected to said skip mechanism and driven thereby and a chain drive connecting said sprocket wheel with said conveyor driving means to drive all parts in predetermined time relationship.

References Cited in the file of this patent
UNITED STATES PATENTS

| | | |
|---|---|---|
| 1,198,798 | Werner | Sept. 19, 1916 |
| 1,223,293 | Rose | Apr. 17, 1917 |
| 2,554,935 | Boucher | May 29, 1951 |
| 2,631,716 | Kottmann | Mar. 17, 1953 |
| 2,723,022 | Van Schie | Nov. 8, 1955 |
| 2,783,872 | Van Schie | Mar. 5, 1957 |
| 2,908,298 | Greenberg | Oct. 13, 1959 |
| 2,999,517 | Cervink | Sept. 12, 1961 |